United States Patent
O'Donnell et al.

(10) Patent No.: US 8,157,177 B1
(45) Date of Patent: Apr. 17, 2012

(54) INDICIA READING SYSTEM WITH IMPROVED BATTERY CHARGING

(75) Inventors: James F. O'Donnell, Camillus, NY (US); Michael Scollan, Morristown, NJ (US); James Ledwith, Morristown, NJ (US); Daniel Van Volkinburg, Syracuse, NY (US)

(73) Assignee: Hand Held Products, Inc., Skaneateles Falls, NY (US)

( * ) Notice: Subject to any disclaimer, the term of this patent is extended or adjusted under 35 U.S.C. 154(b) by 0 days.

(21) Appl. No.: 13/017,909

(22) Filed: Jan. 31, 2011

(51) Int. Cl.
*G06K 7/10* (2006.01)

(52) U.S. Cl. ......... 235/472.01; 235/462.45; 235/462.21; 235/462.42

(58) Field of Classification Search .......... 235/470, 235/462.01, 462.08, 462.41, 462.21, 462.42, 235/472.01, 462.45
See application file for complete search history.

(56) References Cited

U.S. PATENT DOCUMENTS

| | | | |
|---|---|---|---|
| 5,979,757 A | 11/1999 | Tracy et al. | |
| 6,149,063 A | 11/2000 | Reynolds et al. | |
| 6,517,002 B1 | 2/2003 | Piatek | |
| 7,177,958 B1 | 2/2007 | La Blanc et al. | |
| 7,261,238 B1 * | 8/2007 | Carlson et al. | 235/462.08 |
| 7,778,924 B1 | 8/2010 | Ananda | |
| 2001/0049470 A1 | 12/2001 | Mault et al. | |
| 2002/0027164 A1 | 3/2002 | Mault et al. | |
| 2002/0130184 A1 | 9/2002 | Sanders et al. | |
| 2003/0062418 A1 | 4/2003 | Barber et al. | |
| 2007/0002533 A1 * | 1/2007 | Kogan et al. | 361/686 |
| 2007/0138270 A1 | 6/2007 | Reblin | |
| 2007/0267490 A1 | 11/2007 | Jerabeck et al. | |
| 2007/0267501 A1 | 11/2007 | Jovanovski et al. | |
| 2008/0116282 A1 | 5/2008 | Sharra et al. | |
| 2008/0156876 A1 * | 7/2008 | Vinogradov | 235/462.01 |
| 2008/0217411 A1 | 9/2008 | Ledwith et al. | |
| 2008/0314969 A1 | 12/2008 | Hussey | |
| 2009/0001173 A1 * | 1/2009 | Sevier et al. | 235/462.41 |
| 2011/0147459 A1 * | 6/2011 | Goren et al. | 235/462.21 |

* cited by examiner

*Primary Examiner* — Daniel Hess (74) *Attorney, Agent, or Firm* — Heslin Rothenberg Farley & Mesiti P.C.

(57) ABSTRACT

Embodiments of an indicia reading system comprise a terminal and a cradle that communicate via wireless technology and are configured to charge a battery in the terminal using power supplied by a host device when the terminal is operated in a presentation mode.

20 Claims, 5 Drawing Sheets

INDICIA READING SYSTEM WITH IMPROVED BATTERY CHARGING

BACKGROUND

1. Technical Field of the Disclosure

The subject matter of the present disclosure relates to indicia reading systems, and more particularly, to indicia reading systems configured for wireless communication between the terminal and corresponding cradle, where the systems have improved battery charging performance in various operating modes.

2. Discussion of Related Art

Indicia reading terminals and scanners (collectively, "terminals") are available in multiple varieties. These terminals are useful to read and decode the information encoded in decodable or information bearing indicia. Such decodable indicia are utilized generously, from encoding shipping and tracking information for packages, patient identification in hospitals, retail applications, and use on any number of forms and documents including, but not limited to, tax forms, order forms, transaction forms, survey forms, delivery forms, prescriptions, receipts, newspapers, product documents, reports, and the like.

In various environments, the use of decodable indicia, such as bar code symbols, has become the norm for identifying products and inventory. Typically, each item is marked with decodable indicia associated with a description of the item and other attributes (for example, price or patient identification) that are stored in a database of a host device or network system. The terminals are used to read the indicia and provide that reading as input information to host devices. In some cases, the data is provided to the host devices via base units or cradles, which communicate with the indicia reader. Examples of host devices include a hospital patient care system, a computer (fixed or portable), a personal digital assistant (PDA), a portable data terminal (PDT), a point of sale (POS) terminal, a transaction terminal, cash register, server, or similar device.

While stationary presentation-type scanners were the norm, advances upon fixed scanners use terminals that are hardwired to a companion device (e.g., host device). This configuration permits the user to manually move the terminal into position to scan decodable indicia on an item, rather than having to move the item into the field of view of the terminal as required with the stationary presentation-type scanner. The scanned information from decodable indicia is then transmitted to the companion device via the hardwired connection between the two components. Unfortunately, this approach does not eliminate the problems associated with scanning items that are out of reach of the wire that secures communication between the terminal and the companion device. These problems often require that item is repositioned so that the reader may scan the decodable indicia.

In order to eliminate the limitations imposed by hardwiring the terminal to the companion device, another proposed approach is to deploy wireless technology into the terminal. This technology permits the terminal to communicate wirelessly with its companion device. In one example of this approach, the terminal is held in a cradle until needed to read decodable indicia that are normally out of the view of the stationary presentation-type and/or hardwired terminals. The user may manually move the terminal into position to scan the decodable indicia as long as the reader is within a distance where it may communicate wirelessly with its cradle. The scanned information is then transmitted to the cradle over the wireless connection.

Further improvements in wireless terminals are needed such as, for example, there is a need for a wireless terminal with improved battery charging performance and, in particular, improved charging during various operating modes including presentation modes.

SUMMARY

Embodiments of an indicia reading system comprise a terminal and a cradle that communicate via wireless technology and are configured to charge a battery in the terminal using power supplied by a host device when the terminal is operated in a presentation mode.

BRIEF DESCRIPTION OF THE DRAWINGS

So that the manner in which the above recited features of the present invention can be understood in detail, a more particular description of the invention briefly summarized above, may be had by reference to the embodiments, some of which are illustrated in the accompanying drawings. It is to be noted, however, that the appended drawings illustrate only typical embodiments of this invention and are therefore not to be considered limiting of its scope, for the invention may admit to other equally effective embodiments. Moreover, the drawings are not necessarily to scale, emphasis generally being placed upon illustrating the principles of certain embodiments of invention.

Thus, for further understanding of the concepts of the invention, reference can be made to the following detailed description, read in connection with the drawings in which.

DETAILED DESCRIPTION

Figure 1:
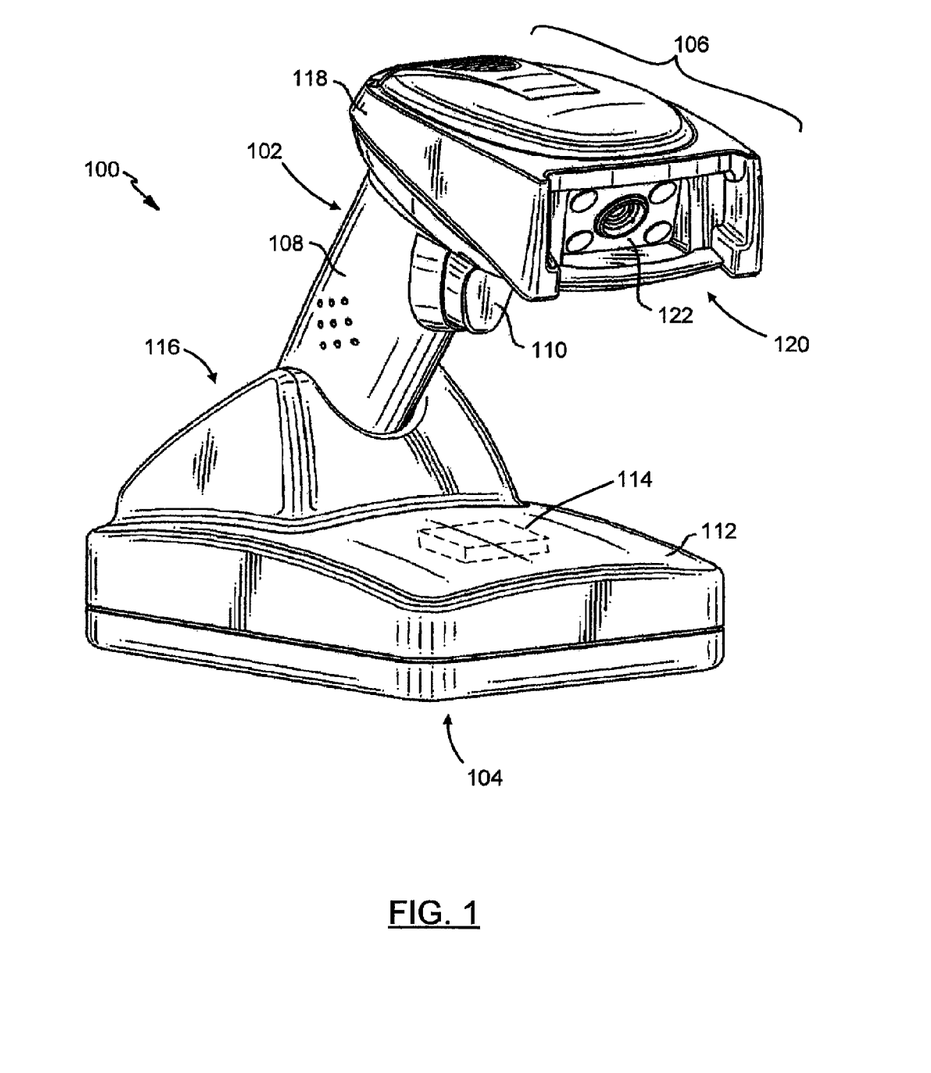
FIG. 1 is a perspective view of an exemplary embodiment of an indicia reading system.

FIG. 1 illustrates an exemplary embodiment of an indicia reading system 100 which includes a terminal 102 and a base or cradle 104. The terminal 102 may be any device capable of reading decodable indicia which bear information and data encoded therein. The cradle 104 may be a docking cradle capable of interacting with the terminal 102 when the terminal 102 is positioned in the cradle 104 as illustrated in FIG. 1. The cradle 104 is often connectable to a host device (not shown). Exemplary host devices include, but are not limited to, a computer, register, point-of-sale (POS) terminal, a transaction terminal, cash register, or similar device.

The terminal 102, the cradle 104, and the host device communicate amongst and between one another. For example, the terminal 102 and the cradle 104 may communicate via wireless technology, e.g., wireless Bluetooth, IEEE 802.11b, or other standardized proprietary and recognized RF devices. These wireless features permit data such as captured image data of remote decodable indicia to be transmitted from the terminal 102 to the cradle 104. Communication of data between the cradle 104 and the host device (and/or the terminal 102 and the host device) may be by way of these wireless devices. Alternative or additional configurations may, on the other hand, utilize wired and wire-type connections such as wires that are configured on one end for a USB connection, a FireWire (IEEE 1394) connection, a RS-232 connection, and the like The indicia reading system 100 can operate in a variety of modes, including manual trigger mode and presentation mode. In manual trigger mode, an operator initiates reading and decoding of decodable indicia such as by actuating a trigger or switch on the terminal 102. The terminal 102 is often removed from the cradle 104 for transport by an operator, which is useful in, e.g., retail settings, to capture and decode data from decodable indicia located on objects in locations removed from the cradle 104. In presentation mode the terminal 102 is held stationary and decodable indicia are passed by terminal 102 to initiate reading and decoding thereof. The presentation mode is most often associated with the terminal 102 at rest and orientated or "docked" in the cradle 104 as depicted in FIG. 1. When the terminal 102 is docked with the cradle 104, the operator positions decodable indicia proximate the terminal 102 rather than the operator moving the terminal 102 to the object on which decodable indicia are disposed. Unlike the manual trigger mode, however, the terminal 102 in presentation mode is often operated continuously such as to decode (and attempt to decode) decodable indicia seriatim.

The terminal 102 can be equipped with a battery (not shown) such as a lithium ion battery to provide power, e.g., during periods when the terminal 102 is removed from the cradle 104 and used in manual trigger mode. Power to operate the terminal 102 when docked with the cradle 104 can originate from the host device such as via a wired connection associated therewith. Electrical terminals and conductive contacts can be used to facilitate communication of an electrical signal between the terminal 102 and the cradle 104. These contacts and their configuration on, e.g., the terminal 102 and the cradle 104, are recognized among artisans with skill in the related register and indicia (e.g., bar code) reading arts, and thus details of their fabrication and integration into the devices of the indicia reading system 100 are not necessary.

The inventors note, however, that because power from the host device may be limited, the indicia reading system 100, and the terminal 102 in particular, is configured to operate at an input current of about 500 mA or less at about 5 V. This is the amount of power typically available via standard USB connections. In one construction the indicia reading system 100 is configured to operate at an input current of only about 400 mA at about 5 V. Pertinent to the discussion that follows below, the input current available from the host device often precludes some of the features and functions of the indicia reading system 100. For example, power provided only from the host device may not be sufficient to operate the cradle 104, the terminal 102 in presentation mode, and concurrently charge (or recharge) the battery of the terminal 102. In one solution, an auxiliary device such as an adapter that is connected to, e.g., an outlet, may be used to supplement (or in place of) the input current from the host device. But while the adapter may provide at least 1 A of input current, the auxiliary device is not effective because this solution requires additional hardware (e.g., the adapter).

Embodiments of the indicia reading system 100 are configured to charge the battery while the terminal 102 is operated in one or more presentation mode using only power from the host device. These configurations minimize loss of battery charge, maintaining at or near optimal level the battery charge when the terminal 102 and the cradle 104 are utilized in normal or substantially normal operation. Normal operation in, e.g., retail settings, describes use of the indicia reading system 100 wherein the terminal 102 and the cradle 104 are in presentation mode for a majority of operation and in manual trigger mode only to image and decode decodable indicia that are on large, bulky items or items that may be placed on the bottom of a customer's shopping cart.

To further illustrate these features reference is directed back to FIG. 1. In FIG. 1, the terminal 102 is depicted in a gun-style form factor 106 that has a handle 108 and trigger 110 disposed thereon and positioned for comfortable grip and hand held operation and activation of the various features of the terminal 102. The cradle 104 has a housing 112 and can include a status indicator 114 such as one or more lights and a socket 116 that may be complimentarily shaped and configured to receive the terminal 102 in the cradle 104. In one exemplary construction the terminal 102 and socket 116 are configured so that the lower portion of the handle 108 may be inserted into the socket 116 which may then hold and support the terminal 102. Configurations of the housing 112 will generally dictate the position, orientation, and location of the socket 116 as well as the operative interface between the handle 108 and the socket 116. For example, the socket 116 may be formed as the generally semi-circular arrangement of features on which rest the forward surfaces of the handle 108. Alternatively, the socket 116 may be formed as a depression or cavity within the housing 112, whereby the resulting cavity is of sufficient depth to receive the bottom portion of the handle 108 but maintain the terminal 102 in a generally upright or slightly downwardly-angled orientation.

Attached to the handle 108 is a head portion 118 with data capture hardware 120 which can comprise an optical reader or laser scanner. Either of these devices may facilitate data acquisition from the decodable indicia. For purposes of the present example, the data capture hardware 120 is configured with an optical reader in the form of an imaging module 122 having features and elements responsive to a trigger signal generated by operator actuation of the trigger 110. These elements enable the terminal 102 to capture an image or frame of data respecting the decodable indicia at which the terminal 102, and particularly the data capture hardware 120, is directed or aimed.

Figure 2:
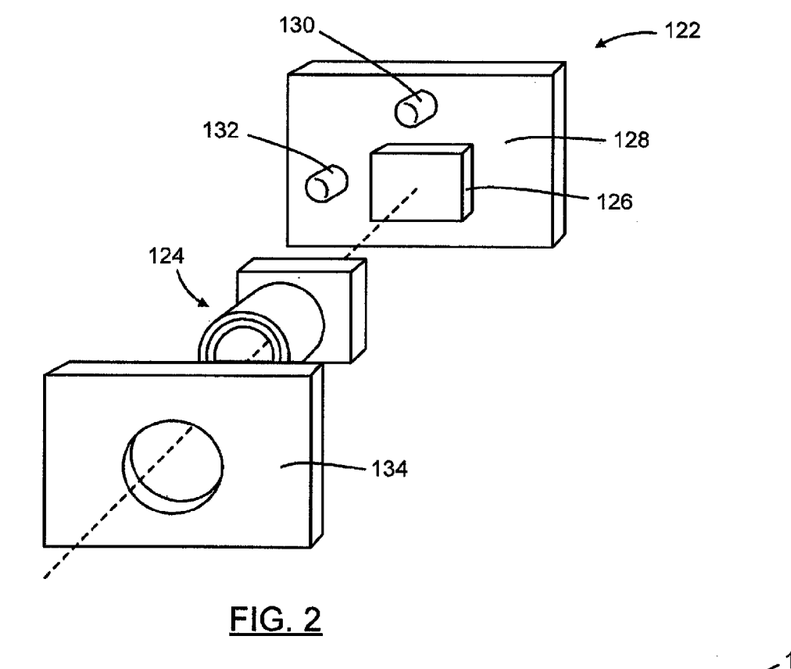
FIG. 2 is a perspective, exploded, assembly view an imaging module for use with indicia reading systems such as the indicia reading system of FIG. 1.
Figure 3:
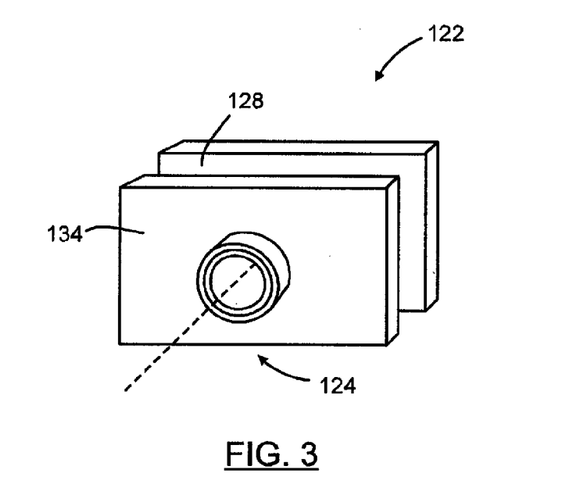
FIG. 3 is a perspective, assembled, assembly view of the imaging module of FIG. 2.

An example of the imaging module 122 is depicted in FIGS. 2 and 3. In one construction of the terminals of the present disclosure, the imaging module 122 can comprise a focus element 124 and an image sensor integrated circuit 126 that is disposed on a printed circuit board 128 together with a first light source 130 and a second light source 132. Here, each of the first light source 130 and the second light source 132 is provided as a single light source. The imaging module 122 can also include an optical plate 134 that has optics for shaping light from the first light source 130 and the second light source 132 into predetermined patterns.

As discussed above, the indicia reading system 100 can operate in a variety of modes. In one example, manual trigger mode is a mode wherein scanning and/or decoding stops or is interrupted and initiated with an actuation event such as operator actuation of the trigger 110. When initiated by depressing the trigger 110, the imaging module 122 may expose (or capture) images continuously and decode (or read) images continuously. Capture and decode may stop once the trigger 110 is released. In presentation mode the terminal 102 is held stationary and decodable indicia are passed by the imaging module 116.

Variations in the presentation mode can also be implemented for use with the indicia reading system 100. Such variations may incorporate changes to the operation of the imaging module 122 such as by selectively changing operation of the first light source 130 and/or the second light source 132. The light sources can be turned on and/or off, dimmed, or otherwise have reduced lighting abilities based on the desired operation. The changes in operation can occur by way of, for example, if no decodable indicia have been sensed for a period of time. Still other variations in the presentation mode may, on the other hand, continuously energize one or more of the first light source 130 and second light source 132. In one example, the indicia reading system 100 operates in a first presentation mode in which one of the first light source 130 and the second light source 132 is continuously energized and the imaging module 122 continuously searches for decodable indicia.

To accommodate for first presentation mode, the terminal 102 can be configured to change one or more pre-defined operating characteristics of the first light source 130 and the second light source 132. In one embodiment, the predefined operating characteristic is selected so that one of the first light source 130 or the second light source 132 is disabled and/or is operated in diminished or reduced operating state. In one example, if the first light source 130 is activated, then the second light source 132 is deactivated. Alternatively, the terminal 102 is configured to permit the operator to select, modify, or change the pre-defined operating characteristic to change the operating state of the non-activated light source. For example, if the first light source 130 is activated, than the operator may select various configurations for the operating state of the second light source 132 such as deactivated, intermittent activation based on, e.g., a pre-determined period of time, and/or reduced brightness based on, e.g., a pre-determined operating current to the second light source 132. The operator may adjust the configuration to change the charging characteristics, wherein certain configurations may be better suited to charge the battery in one or more of the modes.

The cradle 104 can also be configured to operate the status indicator 114 to reduce power consumption. This configuration can accommodate the selection of various low-power or reduced-power indicator lights and/or circuitry that supplies a reduced amount of power to the status indicator 114 in the first presentation mode. In one example, operation of the status indicator 114 is modified so the status indicator 114 is activated in a pre-determined pattern or frequencies that utilize less power. These patterns may be arranged to energize the status indicator 114 at a frequency less than about 0.5 Hz and a duty cycle less than about 15%.

In yet another embodiment of the indicia reading system 100, the cradle 104 is configured to operate under conditions indicative of an auxiliary device, but without the auxiliary device connected to the cradle. This bypass configuration, implemented in one example via circuitry internal to the cradle 104, is useful to raise or overcome certain design limitations such as the 400 mA power limitation discussed above. In one example, the cradle 104 comprises a bypass circuit or similar configuration of components and elements.

It is further noted that while discussed as discrete solutions, each of the configurations of the terminal 102 and the cradle 104 can be combined to improve and/or optimize the operation of the indicia reading system 100. For example, in the first presentation mode, the second light source 132 can be deactivated and the status indicator 114 operated in specific patterns to increase available power that can be directed to the battery. Additional details of these and other configurations are discussed below in connection with FIG. 4.

Figure 4:
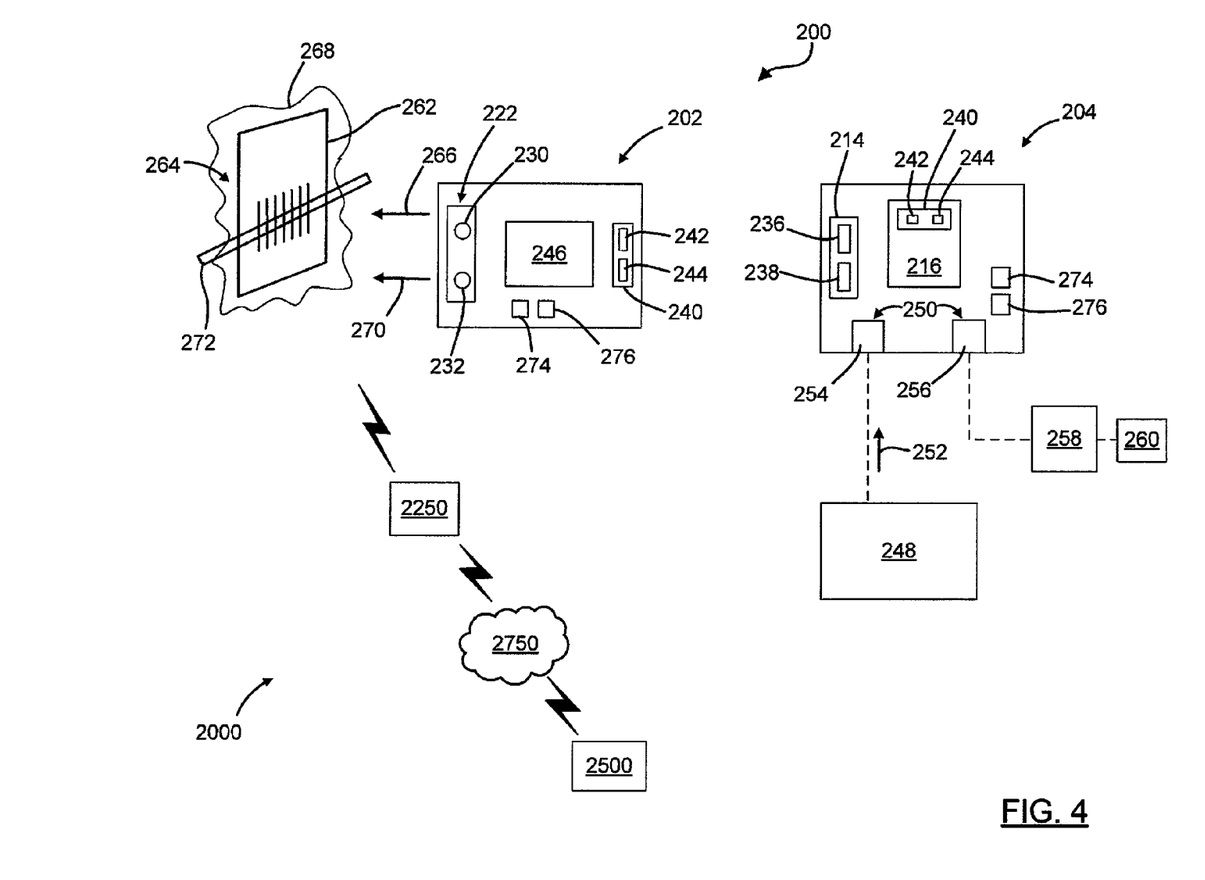
FIG. 4 is a schematic diagram of another exemplary embodiment of an indicia reading system.

FIG. 4 depicts another exemplary embodiment of an indicia reading system 200 in schematic form. Like numerals are used to identify like components as between FIGS. 1-4, but the numerals are increased by 100. For example, the indicia reading system 200 comprises a terminal 202 and a cradle 204. The cradle 204 comprises a status indicator 214 and a socket 216. The terminal 202 comprises data capture hardware 220 including an imaging module 222 with a first light source 230 and a second light source 232.

The status indicator 214 comprises a first indicator 236 and a second indicator 238. Each of the terminal 202 and the socket 216 has a contact interface 240 through which data and information is exchanged and current is communicated between the terminal 202 and the cradle 204. The contact interface 240 comprises a data interface 242 and a charge interface 244 that is used to direct current from the cradle 204 to the terminal 202 to charge a battery 246 arranged therein. The indicia reading system 200 is connectable with a host device 248 such as via an input port 250 on the cradle 204. The host device 248 generates an input current 252 such as the 500 mA input current discussed above. In the present example, the cradle 204 includes a host connection 254, which is connectable to the host device 248 and receives the input current 252, and an auxiliary connection 256 that can receive, e.g., an adaptor 258 that is connectable to an external power supply 260.

The terminal 202 is configured to read and decode decodable indicia 262 disposed on an object or target 264. In one embodiment, the first light source 230 is configured to generate a first light beam 266, which projects in an illumination pattern 268 (also "first pattern 268") towards the target 264 to provide proper illumination for images to be captured by the imaging module 222. The second light source 232 is configured to generate a second light beam 270 that creates an aiming pattern 272 (also "second pattern 272") for assisting an operator to align target 264 with the field of view of the imaging module 222. A number of representative patterns are possible and not limited to any particular pattern or type of pattern for the aiming pattern 272 such as any combination of rectilinear, linear, circular, elliptical, and the like.

Each of the terminal 202 and the cradle 204 comprises a memory 274 and a processor 276, such as a central processing unit (CPU) or microcontroller that may perform a number of functions. The processor 276 can execute one or more machine readable instructions, e.g., software and/or firmware. Such instructions are provided for operation of the terminal 202, the cradle 204, as well as the combination and interaction thereof. These instructions may be stored in memory 274 which may be any type of memory such as RAM, ROM, EEPROM, and the like. One of these functions of the processor 276 may be to decode the relevant symbology of decodable indicia 262. Decoding is a term used to describe, in one example, the interpretation of the symbology contained in the image captured by the imaging module 222. Information respecting the various reference decode algorithms is available from various published standards, such as the International Standards Organization (ISO). Examples may comprise one dimensional (or linear) symbologies, stacked symbologies, matrix symbologies, Composite symbologies, or other machine readable indicia. One dimensional (or linear) symbologies which may include very large to ultra-small, Code 128, Interleaved 2 of 5, Codabar, Code 93, Code 11, Code 39, UPC, EAN, MSI, or other linear symbologies. Stacked symbologies may include PDF, Code 16K, Code 49 or other stacked symbologies. Matrix symbologies may include Aztec, Datamatrix, Maxicode, QR Code or other 2D symbologies. Composite symbologies may include linear symbologies combined with stacked symbologies. Other symbology examples may comprise OCR-A, OCR-B, MICR types of symbologies. UPC/EAN symbology or barcodes are standardly used to mark retail products throughout North America, Europe and several other countries throughout the world.

Referring back to FIG. 4, the indicia reading system 200 is part of a system 2000 having in addition to the host device 248 at least one server such as a local server 2250, a remote server 2500, and a network 2750 through which the local server 2250 and the remote server 2500 can communicate. The configuration of the system 2000 is utilized for processing data such as captured data acquired with, e.g., the data capture hardware 220. For example, one or more of the local server 2250 and the remote server 2500 is utilized to entirely process the captured image data and operate the terminal 202 in a manner consistent with the present disclosure. In one embodiment, one or more of the processor 276 and the memory 274, or complementary ones thereof, are located outside of the terminal 202 such as at the remote server 2500. Captured data is transferred between the terminal 202 to, e.g., the corresponding remote server 2500 for immediate and/or further processing of the captured data. In another embodiment, processing steps disclosed, described, and contemplated herein can be distributed as between the terminal 202, the cradle 204, the host device 248, the local server 2250, and the remote server 2500, with still other embodiments being configured for the image processing steps to be executed entirely by the terminal 202 and/or the cradle 204.

As discussed above, embodiments of the indicia reading system 200 are configured to charge the battery 246 concurrently while the illumination pattern 268 is maintained at a level that permits capture of images for decoding of decodable indicia 262 during one or more of the presentation modes. In one embodiment, the terminal 202 is configured to reduce the amount of operating current impressed on the second light source 232 in the first presentation mode. This configuration may modify the operation of the second light source 232 to change various aspects of the aiming pattern 272. In one example, the second light source 232 is disabled during the first presentation mode. Disabling eliminates the aiming pattern 272 from view. Re-activation of the second light source 232 may require additional interaction with the indicia reading system 200 such as by removing the terminal 202 from the cradle 204 and/or operation of the trigger (e.g., the trigger 110 (FIG. 1)). In another example, the operator selects from among various settings for the second light source 232. Each setting may modify certain behaviors of the second light source 232 to reduce the amount of current required to generate the aiming pattern 272. One setting may disable the second light source 232 for a specific and/or pre-determined time period. Other settings may vary the operation of the second light source 232 such as the intensity, duration, patterning (e.g., the aiming pattern 272), and other aspects of operation contemplated herein.

In another embodiment, the cradle 204 is configured to reduce the amount of current required to operate the status indicator 214 during the first presentation mode. This configuration may modify the operation and construction of the first indicator 236 and the second indicator 238 (collectively, "the indicators"). In one example, the indicators are activated in accordance with pre-defined or pre-arranged patterns. Each of these patterns determines the time for which the indicator is illuminated, and more particularly the amount is selected so as to reduce the consumption of current by the indicators. One pattern may change the state of one or both of the indicators between an ON or first state and an OFF or second state, illuminating (in the ON state) for about 300 milli-seconds and darkening (in the OFF state) for about 2 seconds. In another example, the intensity of one or more of the indicators may be reduced by way of regulating the amount of current supplied to the selected indicator.

Devices for use as the indicators include light-emitting diodes (LEDs) and related semi-conductor-based devices that emit light and may in some examples operate and/or facilitate high-efficiency operation at reduced current levels. These devices can have varying operating characteristics such as color, which include green, red, blue, and combinations there of. In one example, the device that is selected has color characteristics that are most visible to the human eye, and in one preferred construction the device has both optimum color characteristics as well as dissipates and/or requires the least amount of power for operation.

Figure 5:
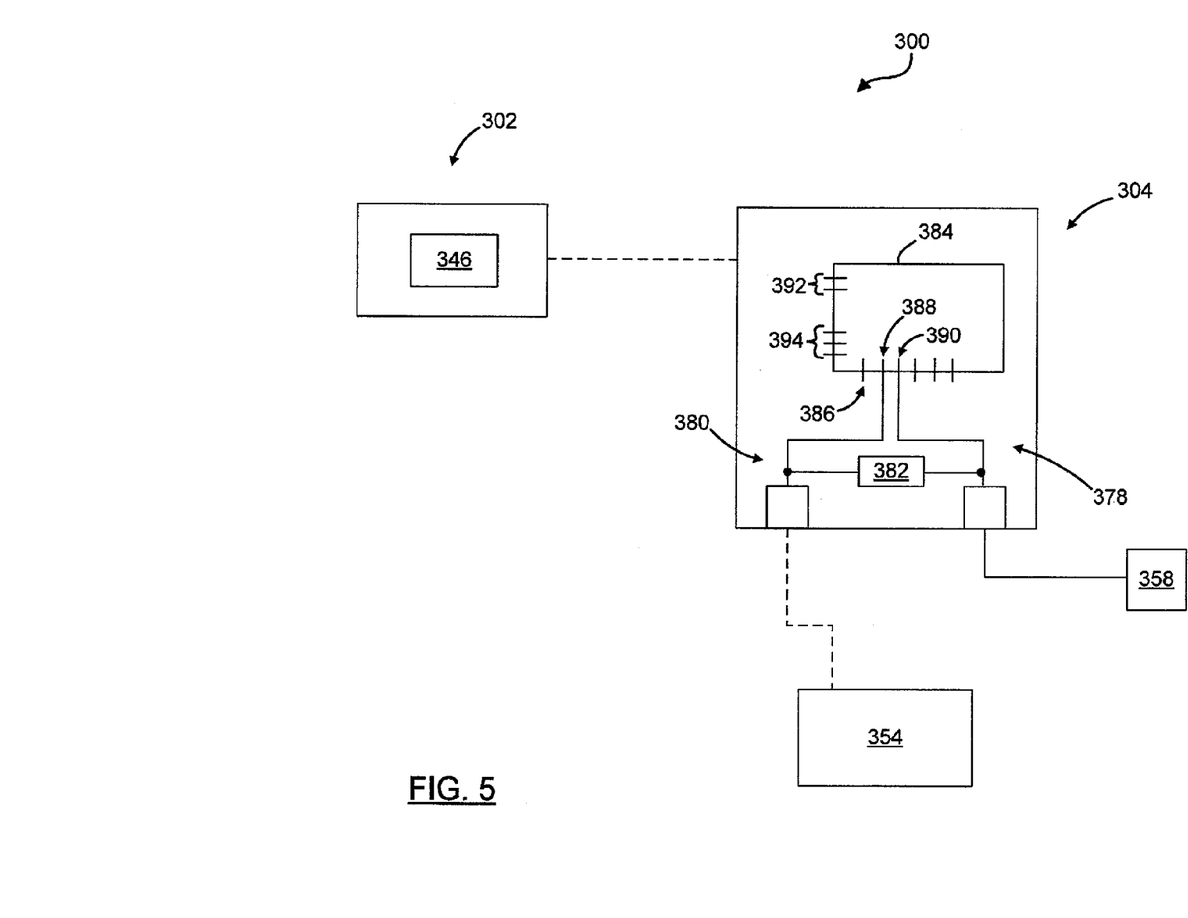
FIG. 5 is a schematic diagram of yet another exemplary embodiment of an indicia reading system.

FIG. 5 depicts yet another exemplary embodiment of an indicia reading system 300. Like numerals are also used to identify like components as between FIGS. 1-5. In FIG. 5, the indicia reading system 300 comprises a terminal 302, a cradle 304, a battery 346, a host device 354, and an adapter 358. The cradle 304 comprises a circuitry 378 that has a bypass circuit 380 with a bypass device 382 and a power path management device 384 such as an integrated circuit chip (e.g., an application specific integrated circuit (ASIC)) with a number of pins 386. In the present example, the pins 386 include a host pin 388 and an auxiliary pin 390 connectable with, respectively, the host device 354 and the adapter 358. The pins 386 also include a terminal pins 392 and cradle pins 394, through which current is provided for operating the terminal 302 and charging the battery 346 (e.g., the terminal pins 392) and for operating the cradle 304 (e.g., the terminal pins 394). Other pins not shown in the present diagram are often appropriately used to implement one or more of the examples and embodiments disclosed herein. However, artisans skilled in the relevant electrical arts will understand the operation of ASIC and related integrated circuitry that instantiate the power path management device 384, therefore details not provided herein.

In one embodiment, the power path management device 384 is configured to automatically select the input power source from among the host device 354 (e.g., at host pin 388) and the adapter 358 (e.g., at auxiliary pin 390). The input power is routed to the terminal 302 and, more particularly, at least a portion of the input power is routed to the battery 346 via the battery pins 392. In one example, the bypass device 382 is operative to route input power from the host device 354 to the auxiliary pin 390, thereby effectively masking the presence (or, more appropriately the lack thereof) of the adapter 358. The bypass device 382 can comprise a discrete element (e.g., a resistor) or, in one example, a relay and/or switch (e.g., a field effect transistor (FET)) which is connectable to the power path management device 384 to allow for automated selection based on the configuration of the power path management device 384 and/or related circuitry.

Figure 6:
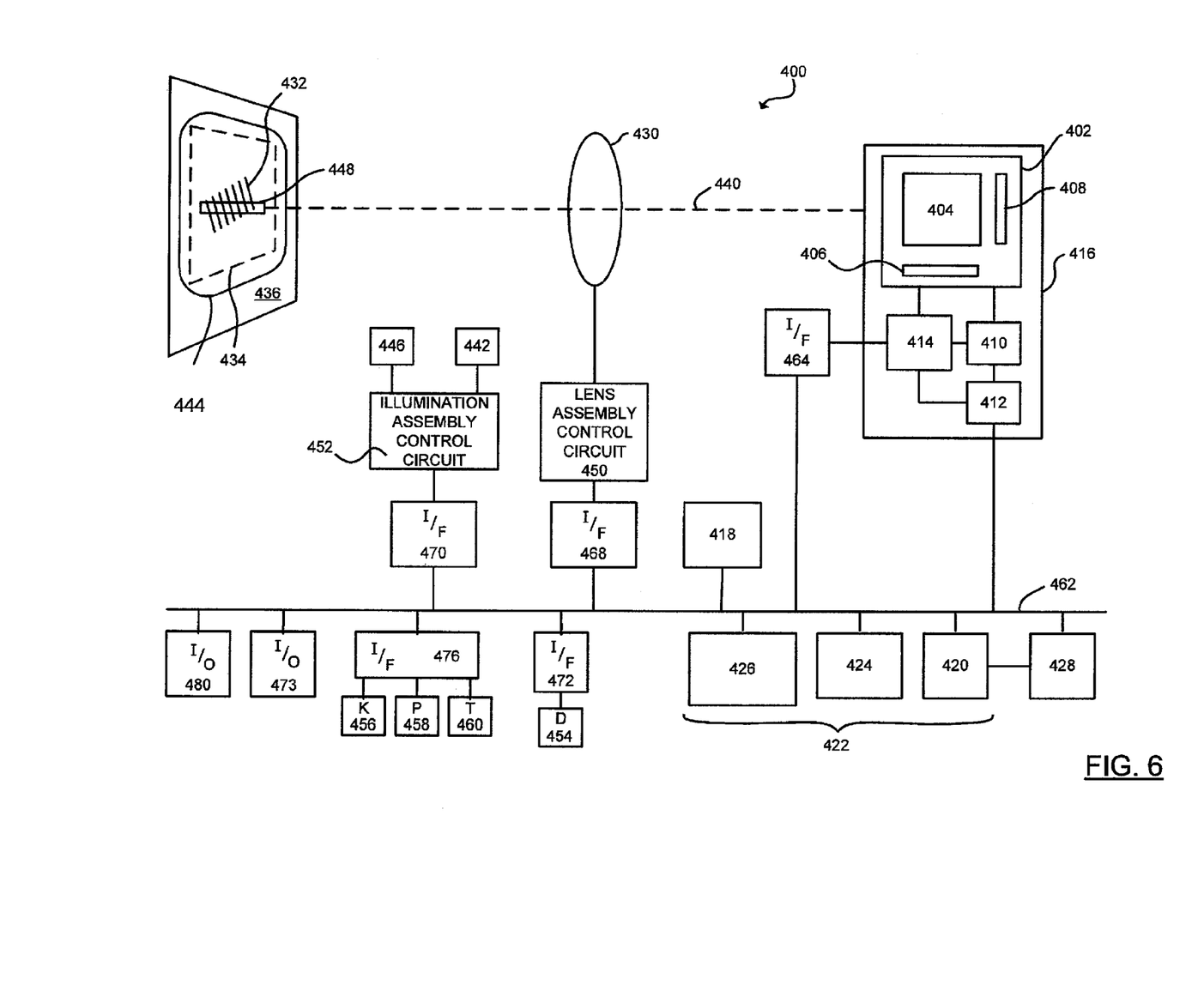
FIG. 6 is a block diagram of an exemplary hardware platform for use in a terminal in an indicia reading system such as the indicia reading systems of FIGS. 1, 4, and 5.

Illustrated in FIG. 6 is another example of a terminal 400 for use in the indicia reading systems of the present disclosure. More particularly an exemplary platform for use as the data capture hardware (e.g., the data capture hardware 120) is depicted. The terminal 400 can include an image sensor 402 comprising a multiple pixel image sensor array 404 ("the image sensor array") having a plurality of pixels arranged in rows and columns of pixels, including column circuitry 406 and row circuitry 408. Associated with the image sensor 402 can be amplifier circuitry 410, and an analog to digital converter 412 which converts image information in the form of analog signals read out of image sensor array 404 into image information in the form of digital signals. Image sensor 402 can also have an associated timing and control circuit 414 for use in controlling, e.g., the exposure period of image sensor 402, and/or gain applied to the amplifier 410.

The noted circuit components 402, 410, 412, and 414 can be packaged into an image sensor integrated circuit 416. In one example, image sensor integrated circuit 416 can be provided by an MT9V022 image sensor integrated circuit available from Micron Technology, Inc. In another example, image sensor integrated circuit 416 can incorporate a Bayer pattern filter. In such an embodiment, CPU 418 prior to subjecting a frame to further processing can interpolate pixel values intermediate of green pixel values for development of a monochrome frame of image data. In other embodiments, red, and/or blue pixel values can be utilized for the monochrome image data.

In the course of operation of terminal 400 image signals can be read out of image sensor 402, converted and stored into a system memory such as RAM 420. A memory 422 of terminal 400 can include RAM 420, a nonvolatile memory such as EPROM 424, and a storage memory device 426 such as may be provided by a flash memory or a hard drive memory. In one embodiment, terminal 400 can include CPU 418 which can be adapted to read out image data stored in memory 422 and subject such image data to various image processing algorithms. Terminal 400 can include a direct memory access unit (DMA) 428 for routing image information read out from image sensor 402 that has been subject to conversion to RAM 420. In another embodiment, terminal 400 can employ a system bus providing for bus arbitration mechanism (e.g., a PCI bus) thus eliminating the need for a central DMA controller. A skilled artisan would appreciate that other embodiments of the system bus architecture and/or direct memory access components providing for efficient data transfer between the image sensor 402 and RAM 420 are within the scope and the spirit of the invention.

Referring to further aspects of terminal 400, terminal 400 can include an imaging lens assembly 430 for focusing an image of a form barcode 432 located within a field of view 434 on a substrate 436 onto image sensor array 404. Imaging light rays can be transmitted about an optical axis 440. The imaging lens assembly 430 can be adapted to be capable of multiple focal lengths and/or multiple best focus distances.

Terminal 400 can also include an illumination pattern light source bank 442 for generating an illumination pattern 444 substantially corresponding to the field of view 434 of terminal 400, and an aiming pattern light source bank 446 for generating an aiming pattern 448 on substrate 436. In use, terminal 400 can be oriented by an operator with respect to a substrate 436 bearing the form barcode 432 in such manner that aiming pattern 448 is projected on the form barcode 432. In the example of FIG. 6, the form barcode 432 is provided by a 1D bar code symbol. Form barcode could also be provided by 2D bar code symbols, stacked linears, or optical character recognition (OCR) characters, etc.

Each of illumination pattern light source bank 442 and aiming pattern light source bank 446 can include one or more light sources. The imaging lens assembly 430 can be controlled with use of lens assembly control circuit 450 and the illumination assembly comprising illumination pattern light source bank 442 and aiming pattern light source bank 446 can be controlled with use of illumination assembly control circuit 452. Lens assembly control circuit 450 can send signals to the imaging lens assembly 430, e.g., for changing a focal length and/or a best focus distance of imaging lens assembly 430. This can include for example providing a signal to the piezoelectric actuator to change the position of the variable position element of the focus element discussed above. Illumination assembly control circuit 452 can send signals to illumination pattern light source bank 442, e.g., for changing a level of illumination output by illumination pattern light source bank 442.

Terminal 400 can also include a number of peripheral devices such as display 454 for displaying such information as image frames captured with use of terminal 400, keyboard 456, pointing device 458, and trigger 460 which may be used to make active signals for activating frame readout and/or certain decoding processes. Terminal 400 can be adapted so that activation of trigger 460 activates one such signal and initiates a decode attempt of the form barcode 432.

Terminal 400 can include various interface circuits for coupling several of the peripheral devices to system address/data bus (system bus) 462, for communication with CPU 418 also coupled to system bus 462. Terminal 400 can include interface circuit 464 for coupling image sensor timing and control circuit 414 to system bus 462, interface circuit 468 for coupling the lens assembly control circuit 450 to system bus 462, interface circuit 470 for coupling the illumination assembly control circuit 452 to system bus 462, interface circuit 472 for coupling the display 454 to system bus 462, and interface circuit 476 for coupling the keyboard 456, pointing device 458, and trigger 460 to system bus 462.

In a further aspect, terminal 400 can include one or more I/O interfaces 473, 480 for providing communication with external devices (e.g., a cash register server, a store server, an inventory facility server, a peer terminal, a local area network base station, a cellular base station, etc.). I/O interfaces 473, 480 can be interfaces of any combination of known computer interfaces, e.g., Ethernet (IEEE 802.3), USB, IEEE 802.11, Bluetooth, CDMA, GSM, IEEE 1394, RS232 or any other computer interface.

Where applicable it is contemplated that numerical values, as well as other values that are recited herein are modified by the term "about", whether expressly stated or inherently derived by the discussion of the present disclosure. As used herein, the term "about" defines the numerical boundaries of the modified values so as to include, but not be limited to, tolerances and values up to, and including the numerical value so modified. That is, numerical values can include the actual value that is expressly stated, as well as other values that are, or can be, the decimal, fractional, or other multiple of the actual value indicated, and/or described in the disclosure.

While the present invention has been particularly shown and described with reference to certain exemplary embodiments, it will be understood by one skilled in the art that various changes in detail may be effected therein without departing from the spirit and scope of the invention as defined by claims that can be supported by the written description and drawings. Further, where exemplary embodiments are described with reference to a certain number of elements it will be understood that the exemplary embodiments can be practiced utilizing either less than or more than the certain number of elements.

What is claimed is:

1. A system configured to read and decode decodable indicia on a target, said system comprising:
   a cradle comprising an input port that is connectable to a host device from which an input current is received, the cradle comprising a socket through which an electrical signal can be conducted; and
   a terminal that is removeably replaceable with the socket, the terminal comprising a battery and data capture hardware which is configured to capture data from the decodable indicia, the data capture hardware comprising a first light source for use in generating a first pattern, the data capture hardware further comprising a second light source for use in generating a second pattern, wherein responsive to docking the terminal with the cradle the terminal is configured to operate in a first mode characterized by the first light source generating the first pattern to provide illumination for use in capturing images by the terminal, the first mode further being characterized by the second light source being disabled, the first mode further being characterized by the battery being charged via the electrical signal.

2. A system according to claim 1, wherein the input port comprises an auxiliary connection and a host connection through which the input current is received from the host device.

3. A system according to claim 2, wherein the host connection is configured for a wire having on one end a USB connection that is connectable with the host device.

4. A system according to claim 2, wherein the cradle comprises a power path management device, and wherein the input current is routed from the host connection to a pin on the power path management device that is connectable with the auxiliary connection.

5. A system according to claim 1, wherein the cradle comprises a status indicator with a light, and wherein the cradle is configured to operate the light in accordance with a pre-determined pattern.

6. A system according to claim 5, wherein the pre-determined pattern energizes and de-energizes the status indicator.

7. A system according to claim 5, wherein the light comprises a light emitting diode.

8. A system according to claim 1, wherein the data capture hardware comprises a second light source that generates a second pattern, wherein the terminal is configured to change operation of the second light source in accordance with a pre-defined operating characteristic, and wherein the pre-defined operating characteristic is configurable by an operator.

9. A system according to claim 8, wherein the pre-defined operating characteristic is configured to disable the second light source in the first mode.

10. A system according to claim 8, wherein the pre-defined operating characteristic defines a pre-determined period of time that the second light source is activated.

11. A system according to claim 10, wherein the second light source is deactivated after expiration of the pre-determined period of time.

12. A system according to claim 8, wherein the pre-defined operating characteristic defines an operating current for the second light source.

13. A system according to claim 1, wherein the terminal is configured to communicate wirelessly with one or more of the cradle and the host device.

14. A system according to claim 1, wherein the input current is less than about 500 mA at 5 V.

15. A system comprising:
a terminal comprising a battery and having an image sensor array comprising a plurality of pixels, a first light source for use in generating a first pattern to illuminate decodable indicia on a target, a second light source for use in generating a second pattern, a lens assembly for use in focusing an image onto the image sensor array, and a housing incorporating the battery and the image sensor array;
a cradle with a socket sized and configured to receive a portion of the housing therein, the cradle having a input port that is connectable to a host device from which an input current can be received; and
a server external to the terminal and the cradle;
wherein the terminal is operative for capture of a frame of image data responsively to a trigger signal initiated by an operator in manual trigger mode, the frame of image data representing the target and the decodable indicia disposed thereon,
wherein the terminal is operative to transmit the frame of image data to the server, and
wherein responsive to docking the terminal in the socket of the cradle the terminal is configured to operate in a first mode characterized by the first light source generating the first pattern to provide illumination for use in capturing images by the terminal, the first mode further being characterized by the second light source being disabled, the first mode further being characterized by the battery being charged via an electrical signal conducted from the cradle to the terminal.

16. A system according to claim 15, wherein the input current is 500 mA or less at about 5 V.

17. A system according to claim 15, wherein the terminal is operative for capture of the frame of image data in the first mode without the trigger signal.

18. A system according to claim 15, wherein the cradle comprises an auxiliary connection that is connectable to an adapter, and wherein the auxiliary connection is empty in the first mode.

19. A system according to claim 15, wherein the terminal comprises a second light source that is disabled in the first mode.

20. A system according to claim 19, wherein the first light source is deactivated when the terminal is removed from the socket.

* * * * *